(12) United States Patent
Badinelli

(10) Patent No.: US 9,490,929 B2
(45) Date of Patent: Nov. 8, 2016

(54) METHOD AND APPARATUS FOR PROTECTING FIBER OPTIC DISTRIBUTION SYSTEMS

(71) Applicant: Christopher M. Badinelli, Huntington Beach, CA (US)

(72) Inventor: Christopher M. Badinelli, Huntington Beach, CA (US)

(*) Notice: Subject to any disclaimer, the term of this patent is extended or adjusted under 35 U.S.C. 154(b) by 0 days.

(21) Appl. No.: 14/304,516

(22) Filed: Jun. 13, 2014

(65) Prior Publication Data

US 2014/0294390 A1 Oct. 2, 2014

Related U.S. Application Data

(62) Division of application No. 12/762,236, filed on Apr. 16, 2010, now abandoned.

(60) Provisional application No. 61/321,317, filed on Apr. 6, 2010.

(51) Int. Cl.
*H04J 14/02* (2006.01)
*G02B 6/44* (2006.01)
*G08B 13/186* (2006.01)
*H04B 10/27* (2013.01)

(52) U.S. Cl.
CPC ......... *H04J 14/0293* (2013.01); *G02B 6/4446* (2013.01); *G02B 6/4469* (2013.01); *G08B 13/186* (2013.01); *H04B 10/27* (2013.01)

(58) Field of Classification Search
CPC . H04J 14/0293; H04B 10/27; G02B 6/4446; G02B 6/4469; G08B 13/186
See application file for complete search history.

(56) References Cited

U.S. PATENT DOCUMENTS

| | | | | |
|---|---|---|---|---|
| 2,265,179 A | * | 12/1941 | MacDonald | H02G 3/0683 174/51 |
| 3,052,748 A | * | 9/1962 | Curtiss | H01R 4/64 174/41 |
| 3,530,418 A | * | 9/1970 | Keogh | H02B 11/26 337/194 |
| 3,815,089 A | * | 6/1974 | Beltrami | B60R 25/10 180/289 |
| 4,132,987 A | * | 1/1979 | Devereaux | G08B 13/1463 340/506 |
| 4,408,821 A | * | 10/1983 | Forney, Jr. | H01R 9/05 439/387 |
| 4,990,721 A | * | 2/1991 | Sheehan | H02G 3/0666 174/660 |
| 5,199,095 A | * | 3/1993 | Iapicco | G02B 6/3865 385/100 |

(Continued)

FOREIGN PATENT DOCUMENTS

| | | |
|---|---|---|
| EP | 380042 | 8/1990 |
| JP | 09069320 | 3/1997 |
| WO | WO 2005010562 | 2/2005 |

OTHER PUBLICATIONS

Department of the Navy, Protected Distribution System (PDS) Guidebook, Information Systems Security (INFOSEC) Guidelines, Module 22, Oct. 1997, pp. 1-22, NAVSO P-5239-22.*

(Continued)

*Primary Examiner* — Peter Radkowski
(74) *Attorney, Agent, or Firm* — Leason Ellis LLP

(57) ABSTRACT

A fiber optic network has alarmed fiber optic lines in the cables connecting a secured junction box to plural user lock boxes. An outgoing alarm line and return alarm line in each cable connect the junction box to each user box. The outgoing alarm line is looped to the return alarm line inside the user lock box. The return alarm line is looped to the outgoing alarm line of a different cable inside the junction box to interconnect a plurality of alarm lines passing through a plurality of user boxes. A detector detects an alarm signal in the connected alarm lines to trigger an intrusion alarm.

22 Claims, 9 Drawing Sheets

(56) References Cited

U.S. PATENT DOCUMENTS

| | | | | |
|---|---|---|---|---|
| 5,806,139 | A * | 9/1998 | Anderson | B60R 16/0222 16/2.1 |
| 6,762,727 | B2 * | 7/2004 | Rochford | H01Q 1/1214 24/289 |
| 6,819,849 | B1 * | 11/2004 | Tangonan | G02B 6/0288 385/12 |
| 6,838,616 | B2 * | 1/2005 | Harrison | H02B 1/44 174/50 |
| 7,092,586 | B2 * | 8/2006 | Vokey | G02B 6/262 385/12 |
| 7,120,324 | B2 * | 10/2006 | Murphy | G02B 6/262 385/12 |
| 7,142,737 | B1 * | 11/2006 | Murphy | G01M 11/3181 340/541 |
| 7,206,469 | B2 * | 4/2007 | Murphy | H04B 10/071 340/541 |
| 7,333,681 | B2 * | 2/2008 | Murphy | G02B 6/421 385/12 |
| 7,376,293 | B2 * | 5/2008 | Murphy | H04B 10/077 385/12 |
| 7,403,674 | B2 * | 7/2008 | Murphy | G02B 6/2852 385/12 |
| 7,403,675 | B2 * | 7/2008 | Murphy | G08B 13/186 385/12 |
| 7,634,387 | B2 * | 12/2009 | Murphy | H04B 10/00 702/183 |
| 7,661,375 | B2 * | 2/2010 | McCarthy | H02G 3/10 109/59 R |
| 7,693,359 | B2 * | 4/2010 | Murphy | H04B 10/071 340/552 |
| 7,706,641 | B2 * | 4/2010 | Murphy | H04B 10/85 385/12 |
| 2002/0195261 | A1 * | 12/2002 | Harrison | H02B 1/44 174/50 |
| 2005/0178571 | A1 * | 8/2005 | McCarthy | F16L 3/26 174/481 |
| 2006/0153491 | A1 * | 7/2006 | Murphy | H04B 10/071 385/13 |
| 2007/0029991 | A1 * | 2/2007 | Murphy | H04R 3/00 324/96 |
| 2007/0086694 | A1 * | 4/2007 | Murphy | H04B 10/85 385/13 |
| 2007/0110247 | A1 * | 5/2007 | Murphy | H04L 9/0858 380/278 |
| 2007/0113268 | A1 * | 5/2007 | Murphy | H04B 10/70 726/2 |
| 2008/0314298 | A1 * | 12/2008 | McCarthy | H02G 3/10 109/64 |

OTHER PUBLICATIONS

Interceptor, Optical Network Security System, www.networkintegritysystems.com.

Network Integrity Systems, Inc, Interceptor Optical Network Security System, Design Guide, Copyright 2010, pp. 1-60, Chapters 1-8.

Network Integrity Systems, Inc., and Communications Supply Corporation, Enhancing the Deployment and security of SIPRNET and JWICS Networks Using Intrinsic Fiber Monitoring, MILCOM 2007, pp. 1-40.

Mickey McCarter, Danger: Fiber Optic Intruder, article, 2007, pp. 1-2, MIT 8.5, www.MIT-kmi.com.

Protective Distribution Systems, Dec. 13, 1996, pp. 1-15, NSTISSI No. 7003, National Security Telecommunications and Information Systems Security.

Shane Shaneman and Cary Murphy, Enhancing the Deployment and Security of SIPRNET and JWICS Networks Using Intrinsic Fiber Monitoring, Article, Copyright 2007, pp. 1-6, 1-4244-1513-06/07.

Interceptor Product Team, Interceptor Alarmed Carrier PDS Provides Information Assurance Benefits for National Security Information on SIPRNET and JWICS Networks, a White Paper, Copyright 2009, pp. 1-4, Network Integrity Systems, Inc.

Department of the Army, Information Assurance Army Regulations 25-2, Oct. 24, 2007, pp. 1-98.

Enhancing the Deployment and Security of SIPRNET and JWICS Networks Using Intrinsic Fiber Monitoring, MILCOM 2007.†

Interceptor Optical Network Security System—Network Integrity Systems.†

Frequently Asked Questions—Network Integrity Sytems.†

NSTISSI No. 7003, Protective Distribution Systems (PDS), Dec. 13, 1996, pp. 1-15.†

Department of the Navy, Protected Distribution System (PDS) Guidebook, NAVSO P-5239-22, Oct. 1997.†

US Air Force ESIM 2009-01, Mar. 20, 2009.†

Secretary of the Air Force, U.S. Air Force Instruction 33-201, vol. 8, Apr. 26, 2005.†

Frequently Asked Questions, Network Integrity Systems, pp. 1-3, Jan. 15, 2010, Network Integrity Systems, https://web.archive.org/web/20100115085101/htttp:/www.networkintegritysystems.com/faqs.cfm.†

NSTISSI No. 7003, pp. 1-15, Dec. 13, 1996, NSTISSC.†

Protected Distribution System (PDS) Guidebook, NAVSO P-5239-22, pp. 1-22, Oct. 1997, Department of the Navy.†

U.S. Air Force Instruction 33-201, vol. 8, pp. 1-44, Publication Date: Apr. 26, 2005, U.S. Air Force.†

Cary Murphy and Shane Shaneman, Enhancing the Deployment and Security of SIPRNET and JWICS Networks Using Intrinsic Fiber Monitoring, MILCOM 2007, pp. 1-8, Oct. 2007, IEEE.†

Air Force Policy Leverages New Technology for Securing Classified Networks, pp. 1-2, Apr. 21, 2009, Business Wire, http://www.businesswire.com/news/home/20090421005311/en/Air-Force-Policy-Leverages-Technology-Securing-Classified#.VcjNxFpqv8s.†

Interceptor Optical Network Security System, Network Integrity Systems, pp. 1-2, Aug. 28, 2008, Network Integrity Systems, Inc., https:/web.archive.org/web/20080828065304/http:/www.networkintegritysystems.com/products.cfm.†

\* cited by examiner
† cited by third party

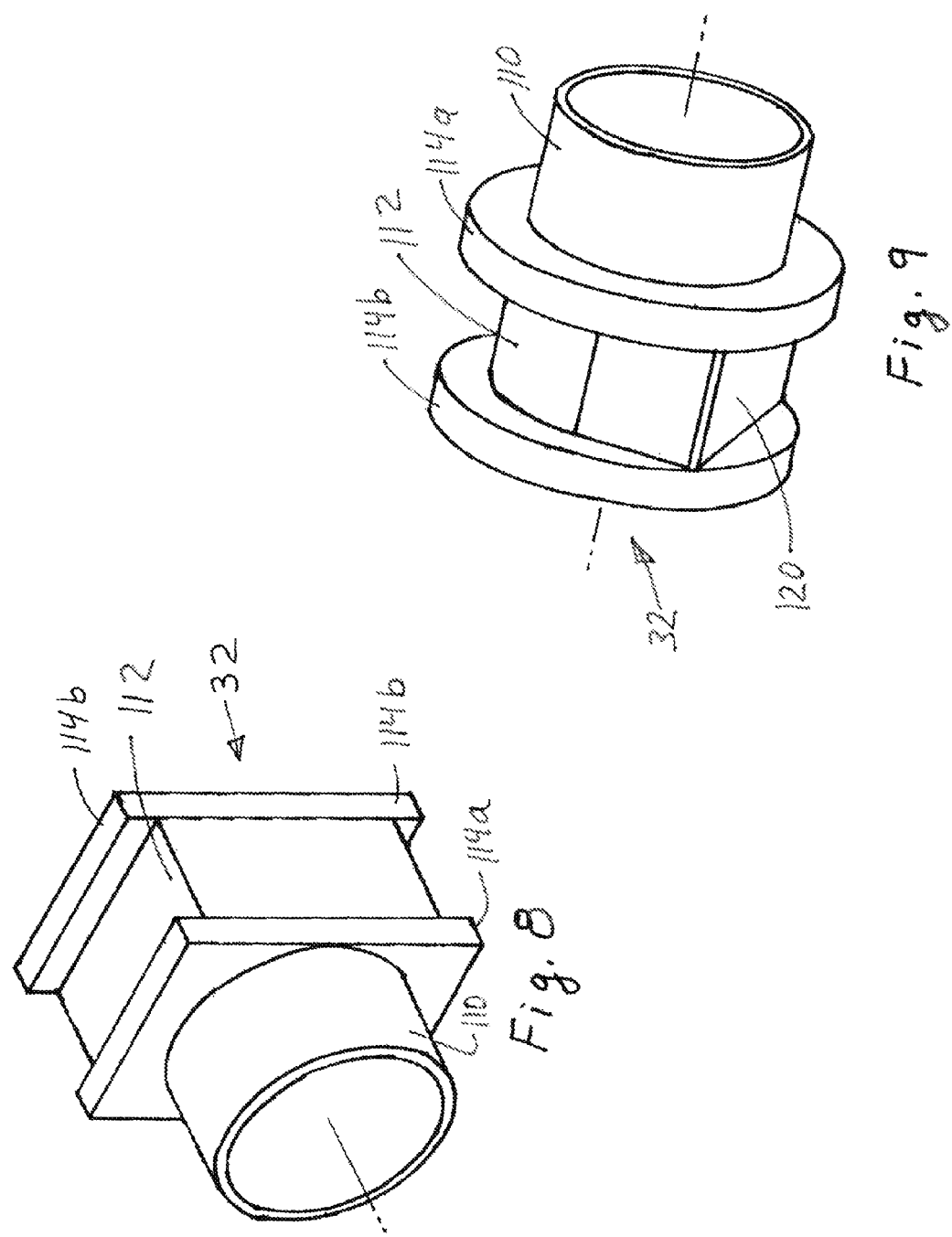

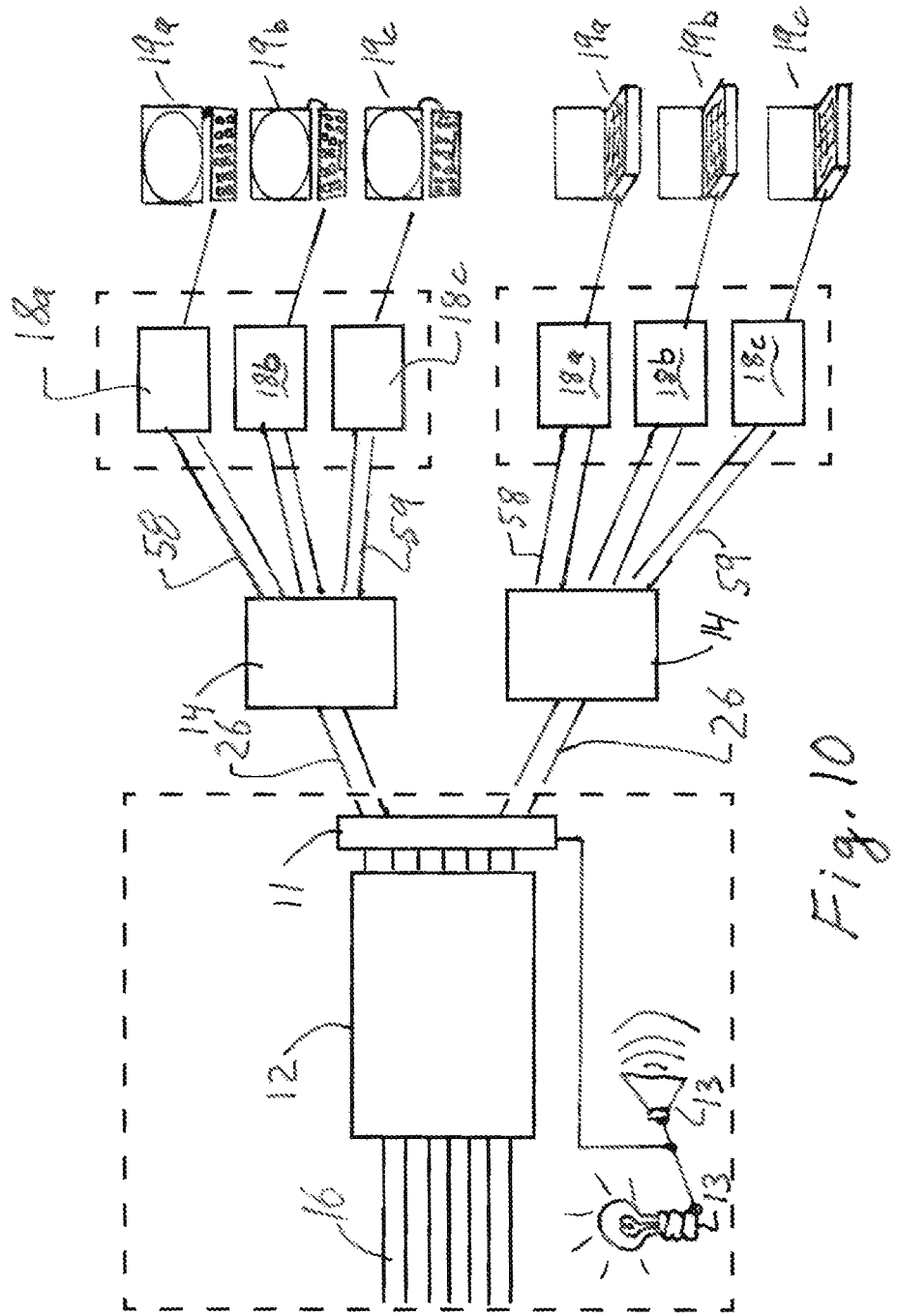

METHOD AND APPARATUS FOR PROTECTING FIBER OPTIC DISTRIBUTION SYSTEMS

CROSS-REFERENCE TO RELATED APPLICATIONS

The present application is a divisional of U.S. patent application Ser. No. 12/762,236, filed Apr. 16, 2010, which claims priority to Provisional Patent Application No. 61/321,317 filed Apr. 6, 2010, the entire contents of which are incorporated herein by reference.

BACKGROUND OF THE INVENTION

Data is sent to computers or sent among computers by electromagnetic transmission through the air (e.g., laser or Wi-Fi), or is sent through wires (typically copper or aluminum), or is sent by fiber optic cables. The transmitted data must be protected in order to guard against intruders intercepting data as it is transmitted. The transmitted data may be encrypted, but encryption impedes potential use of the data and does not restrain the interception of the data in the first place. Encryption also requires time and equipment to encrypt the data, and to decrypt the data, thus increasing expense and causing delays in transmitting and using the data. Since data transmitted over the airways is subject to interception, data transmission over wires or optical cables provides improved resistance to interception.

There is thus a need for an improved way to monitor data transmission between computers or to computers. The U.S. Government need for security and the related development of SIPRNET, JWICS and other secure networks reflects this need for improved ways to prevent data interception or to monitor data to give an alarm when attempts are being made to intercept the transmitted data.

Protective distribution systems are used to deter, detect and/or make difficult the physical access to the communication lines carrying data, especially national security information. Approval authority, standards, and guidance for the design, installation, and maintenance for protective distribution system are stated in NSTISSI 7003. The requirements of this publication apply to U.S. government departments and agencies and further apply to contractors and vendors of these government departments and agencies. Hardened distribution protective distribution systems provide significant physical protection and are typically be implemented in three forms: Hardened Carrier protective distribution systems, alarmed carrier protective distribution systems and Continuously Viewed Carrier protective distribution systems.

In a hardened carrier protective distribution system the data cables are installed in a carrier constructed of electrical metallic tubing (electrical metallic tubing), ferrous conduit or pipe, or ridged sheet steel ducting. All of the connections of the tubing, conduit etc. in a hardened carrier system are permanently sealed around all surfaces with welds, epoxy or other such sealants. If the hardened carrier is buried under ground, to secure cables running between buildings for example, the carrier containing the cables is encased in concrete. The only way to access the data transmission lines is to break through the enclosing physical barrier, and doing so leaves signs of the intrusion which can be detected.

With a hardened carrier system, detection of attempts to intercept the transmitted data is accomplished by human inspections that are required to be performed periodically. Visual inspection requires that hardened carriers be installed below ceilings or above flooring so the physical structure enclosing the data transmission lines can be visually inspected to ensure that no intrusions have occurred. These periodic visual inspections (passive visual inspections) occur at a frequency dependent upon the level of threat to the environment, the security classification of the data being transmitted, and the access control to the area being inspected. Such inspections are costly, subject to inspection error which fails to detect intrusions, and limits the location of the data carrier.

Legacy alarmed carrier systems monitor the carrier containing the data transmission cables being protected. More advanced systems monitor the fibers within the carrier, or are made intrinsic to the carrier, with the cables being protected by turning those cables into sensors, which sensors detect intrusion attempts. But again, such systems are expensive to install, especially if the wire cables serve the dual purpose of acting as intrusion sensors while others transmit data.

Depending on the government organization, using an alarmed carrier protective distribution system in conjunction with suitable protection at cable junctions may, in some cases, allow for the elimination of the carrier systems altogether. In these instances, the cables being protected can be installed in existing conveyance mechanisms (wire basket, ladder rack) or installed in existing suspended cabling (on D-rings, J-Hooks, etc.).

A Continuously Viewed Carrier protective distribution system is one that is under continuous observation, 24 hours per day (including when operational). Viewing circuits may be grouped together to show several sections of the distribution system simultaneously, but should be separated from all non-continuously viewed circuits in order to ensure an open field of view of the needed areas. Standing orders typically include the requirement to investigate any viewed attempt to disturb the protective distribution system. Usually, appropriate security personnel are required to investigate the area of attempted penetration within 15 minutes of discovery. This type of hardened carrier is not used for Top Secret or special category information for non-U.S. Continuously viewing the data distribution system is costly and subject to human error.

Simple protective distribution systems are afforded a reduced level of physical security protection as compared to a Hardened Distribution protective distribution system. They use a simple carrier system (SCS) and the following means are acceptable under NSTISSI 7003: (1) the data cables should be installed in a carrier; (2) The carrier can be constructed of any material (e.g., wood, PVT, electrical metallic tubing, ferrous conduit); (3) the joints and access points should be secured and be controlled by personnel cleared to the highest level of data handled by the protective distribution system; and (4) the carrier is to be inspected in accordance with the requirements of NSTISSI 7003. But this approach also requires high costs, inspections, and manual inspections.

Increasing bandwidth and security demands in Local Area Networks (LAN) are leading to a shift form copper to fiber optic materials to carry the transmitted data. This increased bandwidth will also require Fiber-to-the-Desk (FTTD) as part of the required local area network. The term fiber-to-the-desk is used to describe the (usually) horizontal orientated cabling in the areas of data transmissions and telecommunication, which leads from the floor distributor to the outlets at the workplace on that floor, providing fiber-optic cable transmission to each desktop computer. In the standards ISO/IEC 11801 and EN 50173 this is the tertiary level.

In a secure fiber optic network application Tactical Local Area Network Encryption TACLANE) is a network encryption device developed by the National Security Agency (NSA) to provide network communications security on Internet Protocol (IP) and Asynchronous Transfer Mode (ATM) networks for the individual user or for enclaves of users at the same security level. Tactical local area network encryption allows users to communicate securely over legacy networks such as the Mobile Subscriber Equipment (MSE) packet network, Non-Secure Internet Protocol Router Network (NIPRINet), Secret Internet Protocol Router Network (SIPRNet), and emerging asynchronous transfer mode networks. The tactical local area network encryption limits the bandwidth of a secure fiber optic network to 1 to 10 Gb/s depending on the type network. Providing a secure alarmed protective fiber distribution system enables removing the tactical local area network encryption thereby allowing for 40 Gb/s network systems with that higher data rate provided directly to each desktop.

Approval authority, standards, and guidance for the design, installation, and maintenance for protective distribution system are provided by NSTISSI 7003 to U.S. government departments and agencies and their contractors.

The present invention uses a Protective Distribution System (PDS) solution that can provide Secure Physical Network Security Infrastructure Solution for Secure Passive Optical Network (SPUN), Gigabit Passive Optical Network (GPON), and Fiber to the Desk (FTD) in Intrusion Detection of Optical Communication Systems (IDOCS) applications. The present invention can be customized to each application. The disclosed method and apparatus provide an end to end solution for Secure Passive Optical Networks (SPON), for Gigabit Passive Optical Network (GPON), and Fiber to the Desk (FTTD) is provided for Intrusion Detection of Optical Communication Systems (IDOCS) applications. This method and apparatus improves the deployment, management and protection of defense critical networks and C4ISR Facilities where open storage areas become a challenge.

While allowing the customization of Intrusion Detection of Optical Communication Systems (IDOCS)), the present method and apparatus uses fiber optic data transfer which provides improved technology over copper data transmission mechanisms where data protection is imperative and data speed necessary.

An alarmed carrier protective distribution system provides a desirable alternative to conducting human visual inspections and may be constructed to automate the inspection process through electronic monitoring with an alarm system. In an alarmed carrier protective distribution system, the carrier system is "alarmed" with specialized optical fibers deployed within the conduit for the purpose of sensing acoustic vibrations that usually occur when an intrusion is being attempted on the conduit in order to gain access to the cables. But such alarmed systems have been previously used only in main data transfer conduits between buildings or within computer centers. The present system significantly refines the application of the fiber optic alarms and applies the alarmed lines to junction boxes and user lock boxes.

An alarmed carrier protective distribution system offers several advantages over hardened carrier protective distribution system, including (1) providing continuous monitoring, day and night, throughout the year; (2) eliminating the requirement for periodic visual inspections; (3) allowing the carrier to be placed above the ceiling or below the floor or in other difficult to access locations, since passive visual inspections are not required; (4) eliminating the requirement for concrete encasement outdoors; (5) eliminating the need to lock down manhole covers; and (6) enabling rapid redeployment or modification for evolving network arrangements. While offering numerous advantages, such systems are expensive to install.

BRIEF SUMMARY

A protected distributed fiber optic network is provided that allows the transmission of non-encrypted data to user terminals at 40 Gbps rates while meeting current government security requirements. The protected distribution fiber optic network has alarmed fiber optic lines in the cables connecting a secured junction box to each of a plurality of secured user lock boxes. An outgoing alarm line, a return alarm line and a data line in each cable connect the junction box to each user box. The outgoing alarm line is looped to the return alarm line of the same cable and looped inside the user lock box. The return alarm line is looped to the outgoing alarm line of a different cable inside the junction box with repeated looping in the junction box and user box interconnecting a plurality of alarm lines passing through a plurality of user boxes. A detector detects an alarm signal in the interconnected alarm lines to trigger an intrusion alarm.

An alarmed fiber optic distribution network and method is provided which include fiber distribution panels and secure fiber optic secure junction boxes. Fiber optic jumpers or loopbacks allow for the alarming or un-alarming of fiber optic lines, which lines may comprise secret Internet protocol router networks or non-secure Internet protocol router networks for classified or unclassified data transmission used in conjunction with a protective distribution systems. The protective distribution system may have interlocking armored fiber optic cable attaching to secure junction boxes and attaching to secure lock boxes through the use of locking connect sleeves that are affixed to the interlocking armored fiber optic cables and also affixed to the boxes. The interlocking armored cable has the fiber optic lines inside the interlocking armored conduit and such construction is known in the art and not described in detail herein. Such interlocking armored cable is constructed to meet government security regulations suitable for use in transmitting secret data. Tampering with the cables containing the alarmed lines results in a signal transmission to a telecommunications room or other detector, resulting in notice of the tampering, which in turn may lead to various actions depending on the nature of the security and protocol for handling security threats or breaches.

A secure and alarmed protective fiber distribution system is provided that includes locking fiber distribution cabinets in a secure telecommunications room. The telecommunications room advantageously supports an alarming system and an optional alarm patching system. Rack mounted fiber distribution panels located in the telecommunications room connect fiber optic cables to new or to existing networks, and preferably provide the secure alarmed protective fiber distribution system. The interlocking armored fiber optic cable is run from the secure telecommunications room to various locations as desired to support classified and unclassified networks with an alarm point for one or more selected users. The interlocking armored fiber optic cable is fitted with connectors. The cables are run to secure junction boxes which clamp to the connectors on the cable. These secure junction box advantageously, but optionally, are constructed to meet all U.S. Air Force AFI33-201V8 mandatory requirements for protective distribution systems, and to meet any other applicable security requirements.

The fiber optic cables extending from the secure junction box(es) may carry both the classified and un-classified lines in order to give the user the ability to make the entire network classified or any selected portions classified and alarmed or unclassified and not alarmed. From each secure junction box interlocking armored fiber optic cables extend to network users locations, with the cables having connectors that are clamped to a secure classified secure lock box. Depending on the type of network the secure lock box meets all U.S. Air Force AFI33-201V8 mandatory requirements for protective distribution systems or such other security requirements as are applicable. Depending on the type of network (i.e. passive optical network or Fiber to the Desk top fiber to the desk), a user device may be installed inside the secure lock box.

Two cores or lines in the interlocking armored fiber optic cable are used for alarming the various selected boxes and networks or selected portions of networks. Inside the secure junction box fiber jumpers are installed to provide an alarmed fiber optic line from the user fiber distribution panel to the alarm fiber distribution panel inside the telecommunications room so that the selected user terminals or selected networks are is connected to the alarming system. Within the secure junction box the alarming core or line will loop back the alarm signal to extend the signal to the selected user lock boxes or selected networks. The alarming core or line is not provided for non-secured lines or users or networks.

A protective system and method are disclosed that include fiber distribution panels and secure fiber optic secure junction boxes with the optional use of fiber optic jumpers or loopbacks to allow for the alarming or un-alarming of secret Internet protocol router networks or non-secure Internet protocol router networks to accommodate classified or unclassified data transmission when used in conjunction with a protective distribution system. The protective distribution system has pre-terminated interlocking armored fiber optic cable(s) attaching to secure junction boxes to secure lock boxes with the use of locking connect sleeves that are affixed to the interlocking armored fiber optic cable with epoxy.

The secure junction boxes and secure lock boxes include steel boxes with hidden hinge systems to avoid mechanical, in-line access to hinges. The boxes may have seams that are welded and ground to further inhibit access at the seams. A cable clamping system is preferably installed to accommodate the cable connect locking sleeves that are affixed to each cable. The cable clamp system may allow for per-terminated, pre-connectorized fiber optic interlocking armored cables to be installed in the box and held such that removal of an optical cable from the box is inhibited and that any such removal will result in visually perceptible damage. A Government Service Agency approved padlock may be used on each secure box for locking and inspection.

There is also provided a factory-manufactured, pre-terminated and pre-connectorized, fiber optic interlocking armored fiber optic cable having at least one pre-terminated and pre-connectorized access location for providing access to at least one pre-terminated and pre-connectorized interlocking armored fiber optic cable connector.

Depending on the application for either passive optical network or fiber to the desk topology, a simplex or duplex fiber may be used for the data transmission. In both topologies, duplex fiber may be used for alarming. In order to maximize the use of the alarming ports, loopback connectors are used in the telecommunications room and/or within the secure junction box in order to extend the duplex alarming fiber to each secret Internet protocol router network user. An additional loopback may be installed within the user secure lockbox to return the alarming loop to the telecommunications room or secure junction box. During the installation the dB signal loss for distances and connections need to be considered and accommodated using known techniques to compensate for signal loss.

The present invention uses Intrusion Detection of Optical Communication Systems (IDOCS) and is especially useful in areas of a protective distribution system that cannot be visually monitored but still require protection at all times. Such an intrusion detection system requires minimal cost to install and operate when considering the rising costs of installing and maintaining a data encryption system, and the costs of other alternative protection systems. The benefit of using intrusion detection of optical communication systems over other alarmed carrier technology is that it monitors the same fiber or cable that required protection. Further, its COMSEC-specific development negates the false alarm issue that would result from the technology transfer of traditional fence line systems.

The Secure Passive Optical Network (SPON) solution of the present invention is based on the International Telecommunications Union-compliant Gigabit Passive Optical Network (GPON) technology. This solution provides connectivity for one or more of voice, data, video, and secure and non-secure local area networks, secure passive optical network seamlessly integrates analog and digital video, broadband data, and telephone services onto a common platform. It also provides a Layer 2 passive optical distribution system to end users. An Optical Line Terminal (OLT) at the data center provides the interconnection to the secure passive optical network system. Single mode fiber is then used to carry the optical signal to an Optical Network Terminal (ONT) at the user station that provides an intelligent managed demarcation point for network services.

The present invention advantageously uses Gigabit Passive Optical Networks (GPON) to provide a capacity boost in both the total bandwidth and bandwidth efficiency through the use of larger, variable-length packets in passive optical network technology. The gigabit passive optical network is standardized by the requirements of ITU-T G.984 (GPON). While those requirements permit several choices of bit rate, the industry has converged on 2.488 Gbps of downstream bandwidth, and 1.244 Gbps of upstream bandwidth. A Gigabit passive optical network Encapsulation Method (GEM) allows very efficient packaging of user traffic, with frame segmentation to allow for higher quality of service (QoS) for delay-sensitive traffic such as voice and video communications.

BRIEF DESCRIPTION OF THE DRAWINGS

These and other advantages of the invention will be better understood in view of the following drawings and description, in which like numbers refer to like parts throughout, and in which:

FIG. 8 shows a top perspective view of a cable connect locking sleeve;

FIG. 9 shows a side perspective view of an alternative embodiment of a cable connect locking sleeve; and FIG. 10 shows a schematic layout of a communications room and a fiber optic cable distribution system having secured and non-secured lines.

DETAILED DESCRIPTION

Figure 1:
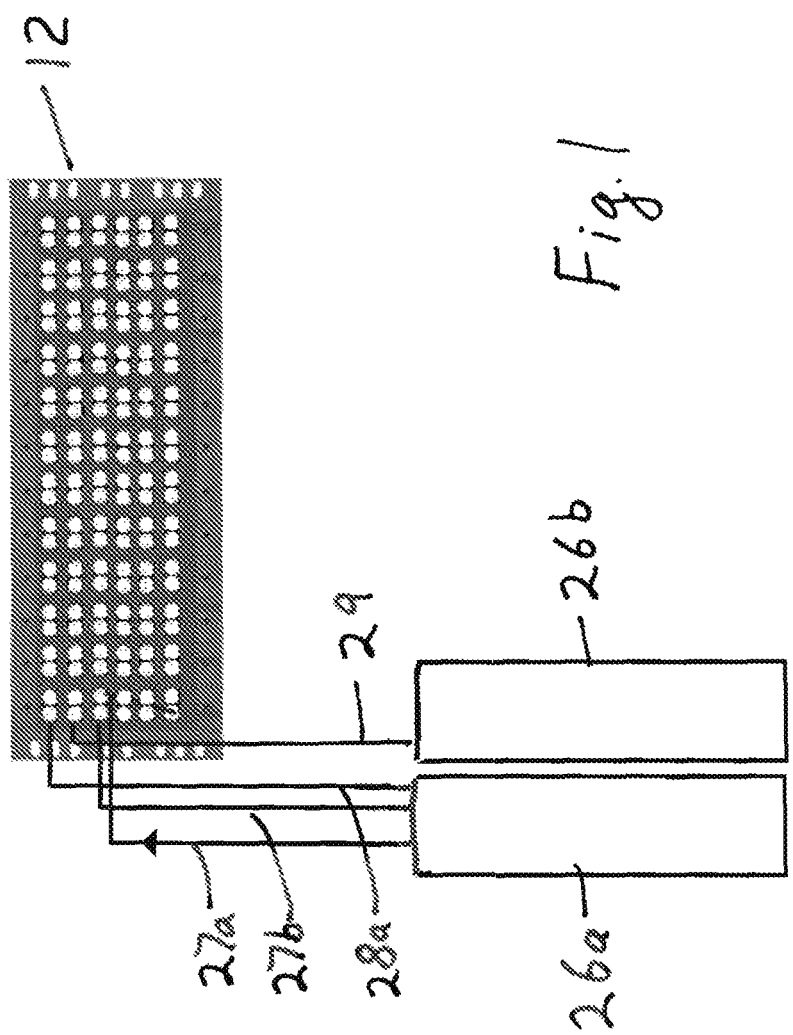
FIG. 1 shows an armored and alarmed protective distribution system applied to an exemplary telecommunication room.

Referring to FIG. 10, a fiber optic distribution system 10 is shown that includes fiber distribution panels 12 preferably, but optionally located in a telecommunications center. The panel(s) 12 in the telecommunications center receive one or more fiber optic cables 16 bearing signals and routes various fiber optic cables 26 from the panel 12 to various locations schematically illustrated in FIG. 10 through various secured boxes 14, 18 and fiber optic cables 58, 59, to end user computer terminals 19. The routed data through cables 26 may come from other sources and need not be solely signals received from fiber optic cables 16.

The telecommunications room provides alarm sensors or detector 11 for detecting tampering or unauthorized access to selected cores or lines in any of a plurality of fiber optic cables 26. The detector 11 activates one or more of various signals 13, including audio signals, visual signals, or laser communication signals or telecommunication signals or electronic signals in response to appropriate signals or lack of signals from the selected alarmed cores or lines within cable(s) 26. The alarmed lines are discussed in more detail below.

The fiber optic cables 26 are advantageously routed from the panel 12 to one or more secure fiber optic junction boxes 14 which in turn route fiber optic cables 26 through further fiber optic lines (e.g., 58, 59) to one or more user lock boxes 18 connected to user computer terminals 19. If desired, the cables 26 may go directly from the telecommunications room to the user lock box 18. The junction boxes 14 may use fiber optic jumpers or loopbacks to allow for the alarming or un-alarming of secret Internet protocol router networks or non-secure Internet protocol router networks for classified or unclassified data transmission when used in conjunction with a protective distribution systems 10. The protective distribution system 10 uses interlocking armored fiber optic cables 26 attaching secure junction boxes 14 to secure lock boxes 18 with the use of locking connect sleeves (FIGS. 8-9) that are affixed to the interlocking armored fiber optic cable 26 and the junction boxes 14. If a selected fiber optic line or core is to be secured, then as discussed later, cable 26 carrying that line has two additional alarm lines, one line carrying an alarm signal to one or more selected locations and one line returning an alarm signal from the one or more selected locations. Jumpers may loop back the alarming line to a selected plurality of locations and before connecting to the return alarm line thus forming a loop of interconnected alarm lines that end up back at detector 11 so that interference or tampering with the cables 26 or boxes 14, 18 results in an alarm detection by detector 11.

A fiber optic cable 26 experiences a signal loss that varies with the length of the cable and any bends in the cable. But signal loss is also caused by touching the cable, moving the cable and changing the light exposure of the cable. The fiber optic cables are sufficiently sensitive to changing conditions and physical contact that the cables experience a signal loss from acoustical vibrations. Thus, a person cutting the protective shielding around a fiber optic cable 26 to access the cable will cause a signal loss. Because light can travel very fast around a loop of fiber optic cable, any contact with a cable or movement of the cable or vibrations on the cable may be detected fast, and the location of the movement, contact, handling, etc. may be located along the length of the cable. The present invention thus uses pairs of fiber optic lines inside fiber optic cables 26 to alarm the cables and detect intrusions or attempts at intrusion. The detector 11 sends a signal through a fiber optic line and monitors the return signal to detect changes in the signal strength that reflect intrusions or cable movement, and that identifies the location of the intrusion along the fiber optic cable. Various detectors 11 may be used, with a detector named the Interceptor and sold by Network Integrity Systems in Hickory, N.C., believed suitable for use.

The cables 26 are preferably pre-terminated (i.e., connectors are attached by the manufacturer) where possible, and are advantageously armored by placing the cables inside a suitable carrier such as an interlocking armored cable, Electrical Metal Tubing (EMT), PVC pipe, or other suitable conduits meeting the security requirements of the particular application. Enclosing the fiber optic cables 26 in such armored conduits increases the sensitivity of the alarming lines because of the physical force needed to breach the conduits and reach the fiber optic lines, and because even the change in ambient light from a hole in the cable may be detected.

Referring to FIGS. 1-3, 5, 7 and 10, the cable 26 takes the form of one or more data feeds 26 from the telecommunications room which feed data to a secure junction box 14. For illustration, data cable 26a is a classified secret Internet protocol router network data and data cable feed 26b is an unclassified feed. The data feeds 26 are secured fiber optic cables. The junction boxes advantageously conform to U.S. Air Force AFI33-201V8 or other applicable specifications or regulations. The secure junction box 14 is configured to limit access to only authorized personnel, via use of various locking devices including keyed locks, padlocks, or electronic locks which may be unlocked by the authorized personnel. The junction boxes 14 are usually metal with no access other than through locked access doors, lids or panels with access controlled by the locking devices. Attempts at unauthorized entry to the junction box 14 will leave visual indications, or if electronically locked, the electronics may track time, date and personnel accessing the junction boxes 14 or may track attempts to access the junction box. Various electronic motion sensors or force sensors may be used to detect such attempts at access.

Figure 2:
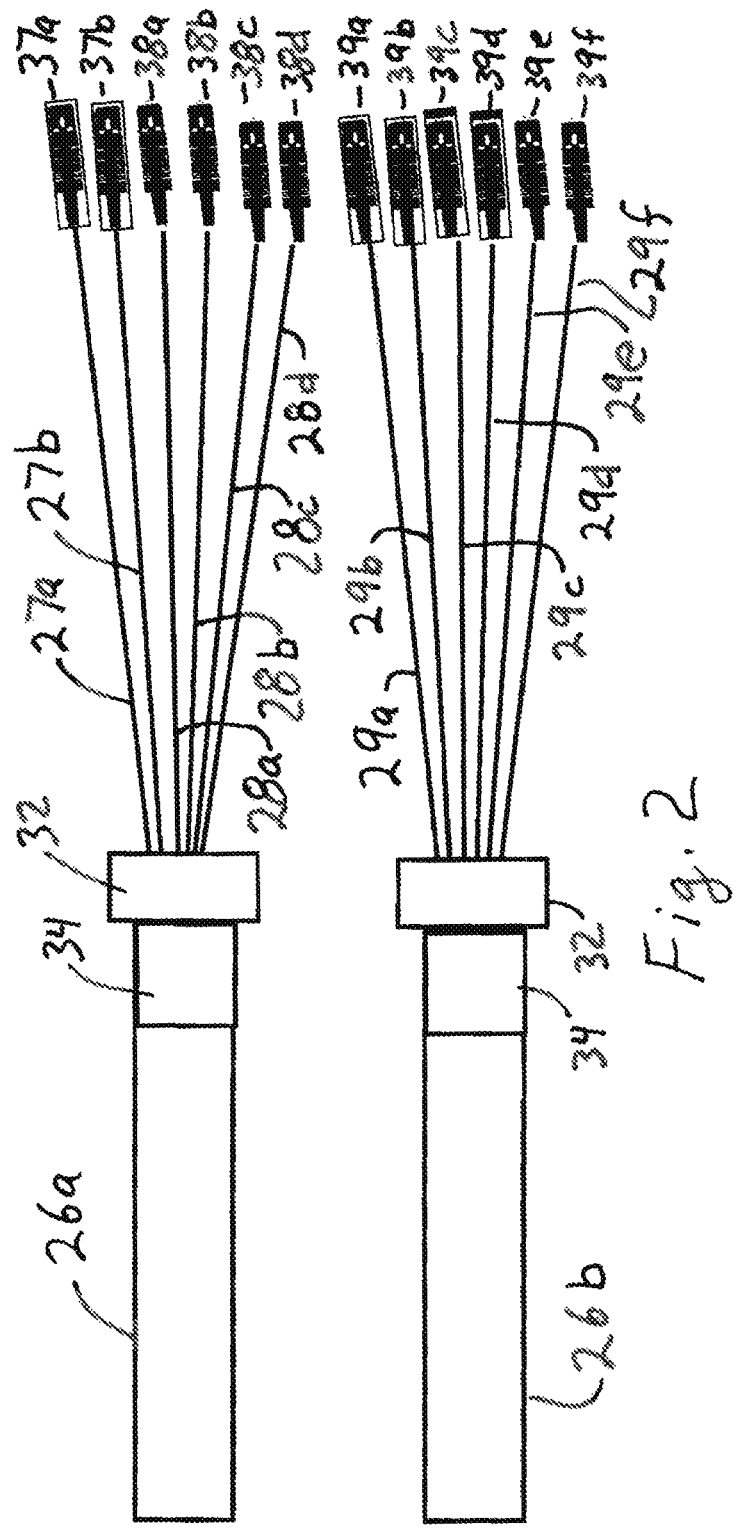
FIG. 2 shows a pre-terminated interlocking jumper configuration.

The data feed 26a may contain a plurality of lines that may transfer data of differing security levels, with each data transfer line receiving differing security protections. For illustration, feed line 26a includes secure data lines 27a, 27-b and secret data lines 28a, 28b, 28c, 28d (FIG. 2) while unsecured feed line 26b includes non-secret and non-secure data lines 29a through 29f (FIG. 2).

Each of the data lines 26a, 26b etc. is separately connected to a fiber optic patch panel 12 that is preferably rack mounted to allow multiple panel support and many connections. The fiber optic patch panel 12 connects the secure lines 26 to a fiber-to-the-premises (FTTP) network using passive optical network (PON) components. The patch panel 12 is advantageously located within or forms a wall of a secured box or facility so that access to the data lines 27, 28 and 29 are limited and require access through a tamper evident junction box. Thus, the rack mount fiber patch panel 12 connects data feeds 26 to the new or existing optical line terminal or fiber to the desk network and could also be used for alarm patching. Both classified secret Internet protocol router networks 26a and un-classified non-secure Internet protocol router network 26 are connected to the rack mount fiber patch panel 12.

Fiber optic lines 26, 27 are alarmed fiber jumper lines configured to alarm a user lock box 18. From the junction panel 12, the data feeds 26 are routed to various junction boxes throughout a floor in a building and then routed to users on that floor. If desired, the alarming of the secure data feeds 26 from the distribution panel 12 may be the same as the alarming of the junction box described below. Preferably, the patch panel 12 forms a back wall of a panel junction box 14 and the data feed(s) 26 may be fastened to the back wall in a way that forms a secure, tamper resistant and tamper evident connection with the junction box.

The alarming devise (in lines 27) is also connected to the rack mount fiber patch panel 12 and could be jumper connected to any secure junction box 14. The cables 26 may be pre-terminated (i.e., connectors are attached by the manufacturer) and have interlocking armored fiber jumper cable (FIG. 2) to connect from the telecommunications room fiber patch panel 12. Color coded fiber optic connectors may be used to assign the type of connectivity.

Referring to FIG. 2, cable connector locking sleeves 32 are preferably affixed to the armored cable outer jacket. The locking sleeves 32 connect securely to the secure junction boxes 18 (FIG. 3) as described later. The connectors 32 have tubular portions that fit over the armored cable outer jacket and may be affixed annularly with suitable adhesive or epoxy. A strip of adhesive heat shrink tubing 34 may overlay the cable connector locking sleeve to further secure it to the cable outer jacket. A one inch length of tubing (shrunk) 34 is believed suitable and provides a tamper evident covering and connection.

The data feeds 26a, 26b may contain any number of fiber optic feeds, some of which are classified (27) or secure (28) or unclassified (29), with the appropriate level of fiber optic line being physically routed to the appropriate user terminal. The fiber optic lines are preferably color coded, with black fiber optic lines or connectors indicating alarming feed for patching classified users, with red fiber optic connectors indicating classified secret Internet protocol router network feed for patching classified users and with green indicating un-classified non-secure Internet protocol router network feed from the telecommunications room. Appropriate fiber optic connectors 37a-b, 38a to 38d and 39a to 39f on data lines 27a-b, 28a to 28b, and 29a to 29f, respectively, provide for connection with other fiber optic lines. The connectors 37, 38, 39 may be color coded as desired, preferably matching the wire colors, with red or black reflecting classified data line connectors and green reflecting non-classified data line connectors.

Figure 3:
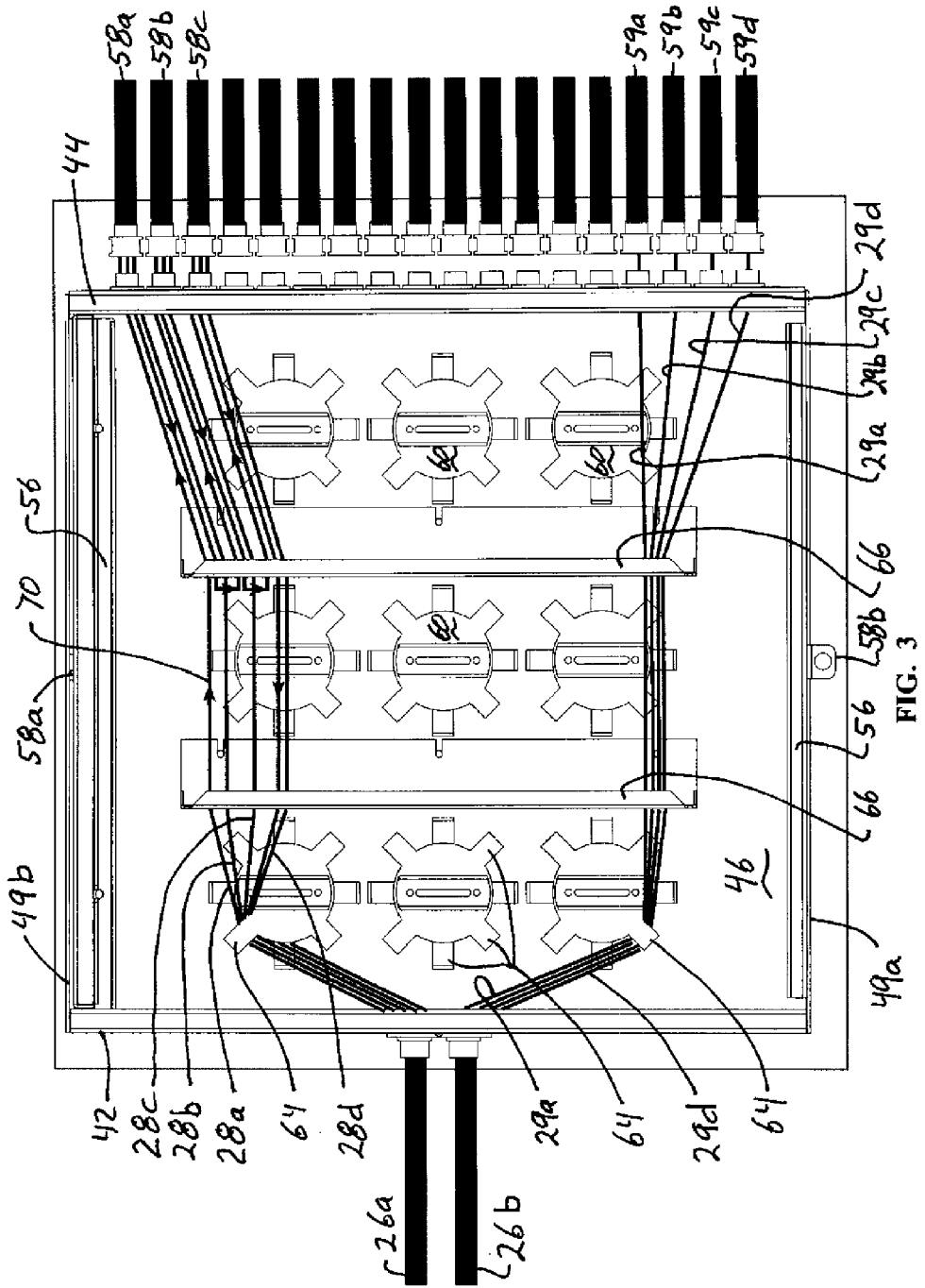
FIG. 3 is a top plan view of a secure cable junction box.
Figure 5:
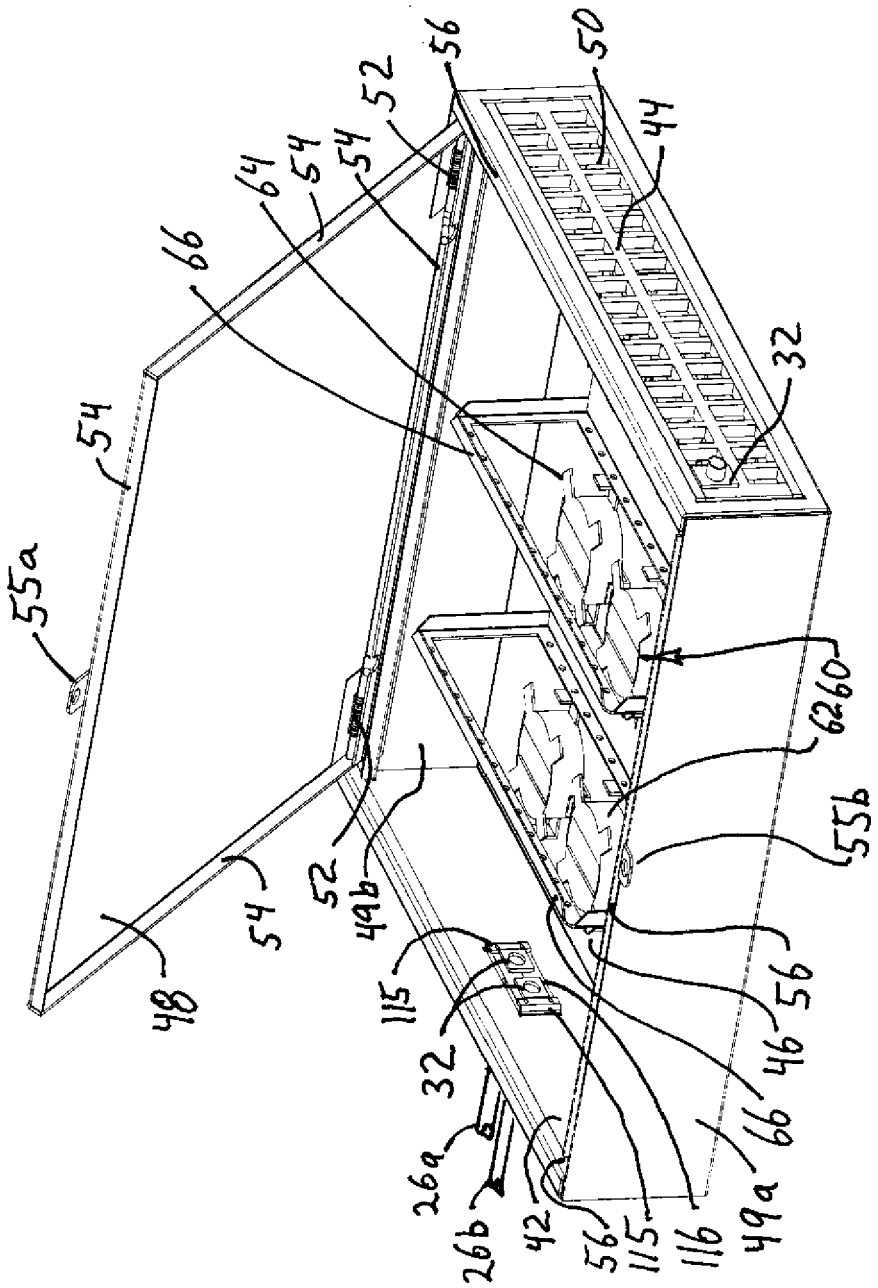
FIG. 5 is a perspective view of a secure cable junction box as partially shown in FIG. 3 but without the fiber optic lines.

Referring to FIGS. 3 and 5, the fiber optic data feeds 26 have data lines 27, 28, 29 that are physically routed to appropriate outlet lines connecting to user lock boxes 18. For simplicity, only two data feeds 26a, 26b are shown with a limited number of data lines. But any number of the various feed lines 26 and data transfer and alarmed lines 27, 29, 29 may be used.

The junction box 14 may have various shapes, and is shown with a rectangular shape having six (preferably flat) sides, with the data input feed lines 26 connected to a first end panel 42 and data output fiber optic data transfer cables 58, 59 on opposing end panel 44, with connectors 32 held in mating restraints or recesses 50 (FIG. 5) in the end panel 44 as described later. The end panels 42, 44 are held apart by a bottom 46 and a top 48, with side walls 49a, 49b. The top, bottom, ends and sides of the junction box 14 are preferably made with a maximum thickness of 12 gauge steel and a minimum thickness of 16 gauge steel. The top 48 is preferably hinged internally at hinge 52 (FIG. 5) to form a lid that may be opened to allow access to the inside of junction box 14. The hinges 52 are located inside the box 14 so that the hinge is not externally accessible. The top 48 preferably has a depending flange or lip 54 around its edges. Channels 56 are located around the upper edges of the ends 42, 44 and the two sides 49a, 49b with the channels 56 having a U-shaped cross section and oriented to receive the flange 54 on the top or lid 48. The interlocking or mating lip 54 and channels 56 block straight line access to the interior of the junction box 14 so that a screwdriver or pry bar cannot be inserted beneath the top 48 to pry it open. The construction provides no mechanical, in-line access to the hinges once the box is locked. Advantageously, the secure junction box 18 has no gap larger than 0.06 inches in any of the interface between the main box and any associated mating components, e.g. hinged top 48, access panels, etc.

A locking mechanism preferably releasably holds the top 48 to the remainder of the junction box 14. Electronic locks, keyed locks, or padlocks can be used to connect the hinged top 48 to the remainder of the junction box 14. A two-part hasp 55a, 55b, each having an opening through which a padlock shank (not shown) can be inserted is shown to represent a typical locking mechanism. Any padlock is preferably a GSA authorized padlock. The hinges 52 are preferably mounted to an outer edge of the channel extending along sidewall 49b to conceal the hinges 52 inside the junction box 14 and shield the hinges from external access outside the junction box 14.

The fiber optic lines 27, 28, 29 are routed through the junction box 14 around various fiber optic guides 60 to the appropriate corresponding outlet connector 50, and corresponding outgoing lines 57, 58, 59, respectively. The fiber optic guides 60 may take various forms, but are shown as cylindrical hubs 62 having a bottom or first end fastened to the bottom 46 of the junction box 14, and an upper end or second end forming projections 62 extending outward from the hub. The curved shape of the hubs 62 is selected to be large enough to not damage the fiber optic cables as the fiber optic lines 27, 28, 29 are wound around the cable guides 60 to arrange the lines to appropriate outlet connector 50. The projections 62 keep the fiber optic cables from sliding up and off the curved hubs 62.

Supporting frames 66 are optionally fastened to the bottom 46 and/or side walls 49a, 49b to restrain the top 48 from being pushed inward toward the hubs 60, and to restrain any fiber optic cables or lines inside the junction box 14. The frames 66 are preferably made of angled channel members to allow easy threading of the fiber optic lines around the various cable guides 60 and to allow increased strength and easy fastening to the bottom 46 and sidewalls 49. The frames 66 can also be used for routing of the fiber optic cables within the junction box 14 by allowing cable bundles to be tied to various portions of the frame to support the cables and control cable location and/or cable movement.

The fiber optic lines 27, 28 and 29 are threaded around one or more of the cable guides 60 so the lines connect to the appropriate outgoing line connector 50. The lines are preferably color coded or otherwise labeled to make tracking and checking easier. Advantageously, black fiber optic connectors represent transmitting alarming feed for patching classified users, red jacketed lines 28*a*, 28*b*, 28*c* and connectors indicate classified secret Internet protocol router network data feed from the telecommunications room and green fiber optic connectors and lines 29*a* through 29*d* represent transmitting data feed for patching un-classified users with in junction box 14.

Referring to FIG. 3, a single alarmed line 70 may be used to alarm a plurality of the selected data transfer lines 28, 29 within the junction box 14. Alarm line 70 comes from data feed line 26, accompanies one or more of the data lines 28*a*, 28*b*, 28*c* exiting the junction box 14 to communicate with user lock box 18 (FIGS. 4, 6 & 10) and then loops back to the junction box 14 before returning a signal back through data feed line 26. In more detail, data feed line 26 (e.g., from the telecommunications room) and secret data transfer lines 28*a*, 28*b*, 28*c* and non-secure data transfer lines 29*a* through 29*d*. But the alarm line 70 is looped so it goes along with and returns from each user line 58*a*, 58*b* and 58*c* to the associated user lock box 18. Specifically, the data transfer lines 28*a*, 28*b* and 28*c* are routed to the outlet connectors 50 for corresponding user lines 58*a*, 58*b*, and 58*c*, respectively. Alarm line 70 (identified as 70*a* out) passes through cable or line 58*a* along with line 28*a* and returns through cable 58*a* as line 70*a* return. Line 70*a* return is looped and accompanies line 28*b* as line 70*b* out and returns through cable 58*b* as line 70*b* return. Line 70*b* return is looped and accompanies line 28*c* as line 70*c* out and returns through cable 58*c* as line 70*c* return. The looping can be repeated as many times as needed. The final return alarm line (here, 70*c* return) returns its signal through data transfer cable or line 26 to the telecommunications office where the signal is monitored.

If the data transmission is interrupted, as by data tampering, theft, damage or other actions affecting the data transmission through the fiber optic cable, the interruption is detected at the telecommunications office by detector 11, which preferably both sends a signal through the outgoing alarm line and receives a signal from the return line in order to identify variations in the signal strength reflecting intrusions, intrusion attempts, and the location of such intrusions or attempts along the length of the alarm lines. This detection assumes that the data transmission of one line in a cable cannot be intercepted without disrupting the signal in the accompanying alarmed lines in the same cable.

Data transfer lines 29*a* through 29*d* are routed through junction box 14 and hubs 60 to the corresponding connectors 50 for corresponding user lines 59*a*, 59*b*, 59*c* and 59*d*. Since these lines are unsecured and not alarmed, the alarm line 70 does not accompany these data transfer lines. By removing the top 48, the fiber optic connections to any specific end user or user lock box 18 can be altered to add or remove alarmed lines by looping the alarmed line 70 around the desired line going to the selected user lock box 18, or by removing the looped alarmed line from user lock box that need no longer be secured. The cables 26 connecting the junction box 14 with the user lock box 18 can be re-routed for each user lock box 18 as needed, or the alarm lines 70 can be placed in the initial cables 26 and just connected or disconnected in the junction box 14 as needed to form alarmed or non-alarmed lines.

Figure 4:
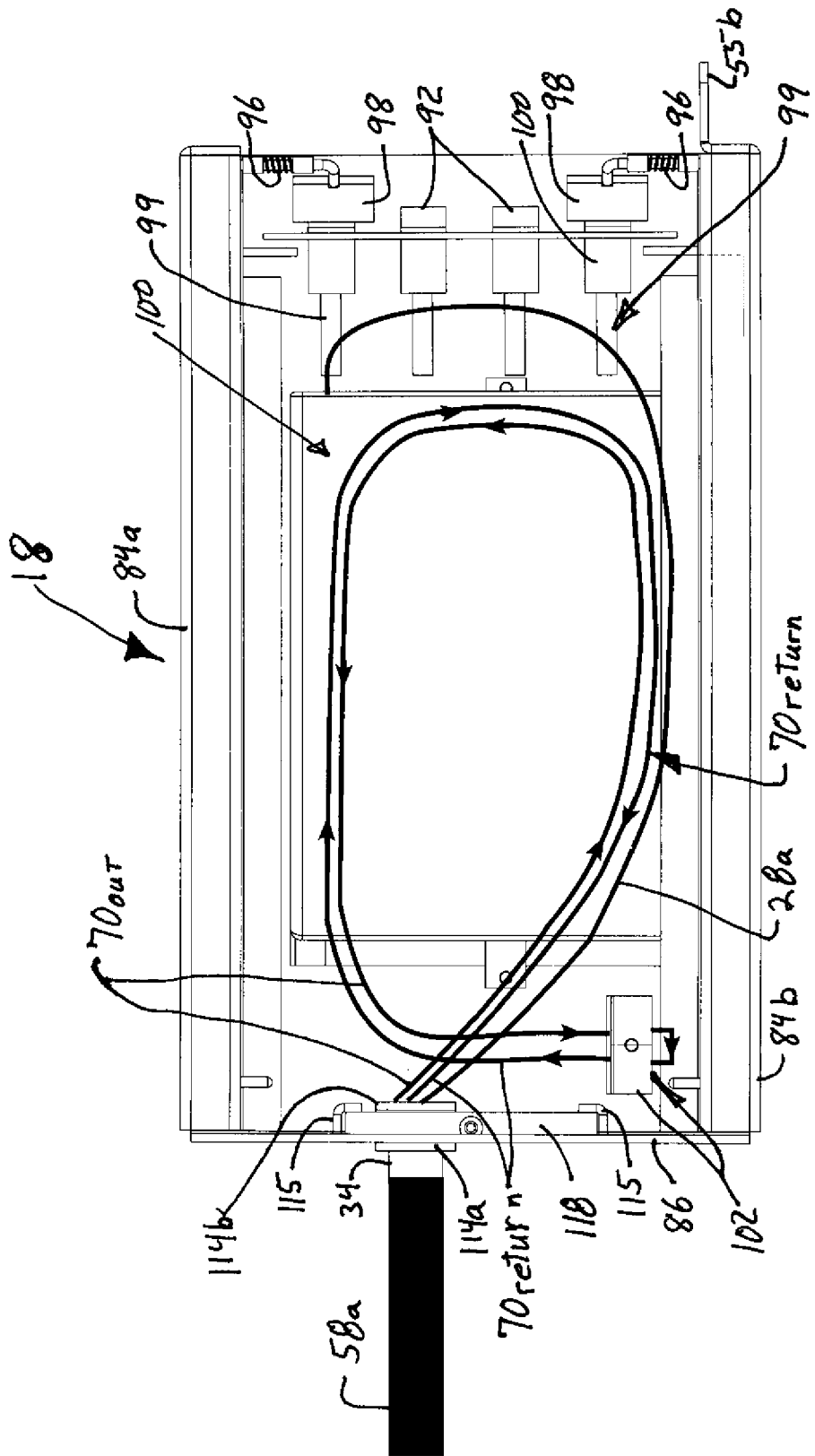
FIG. 4 is a top plan view of a secure user lock box cable configuration.
Figure 6:
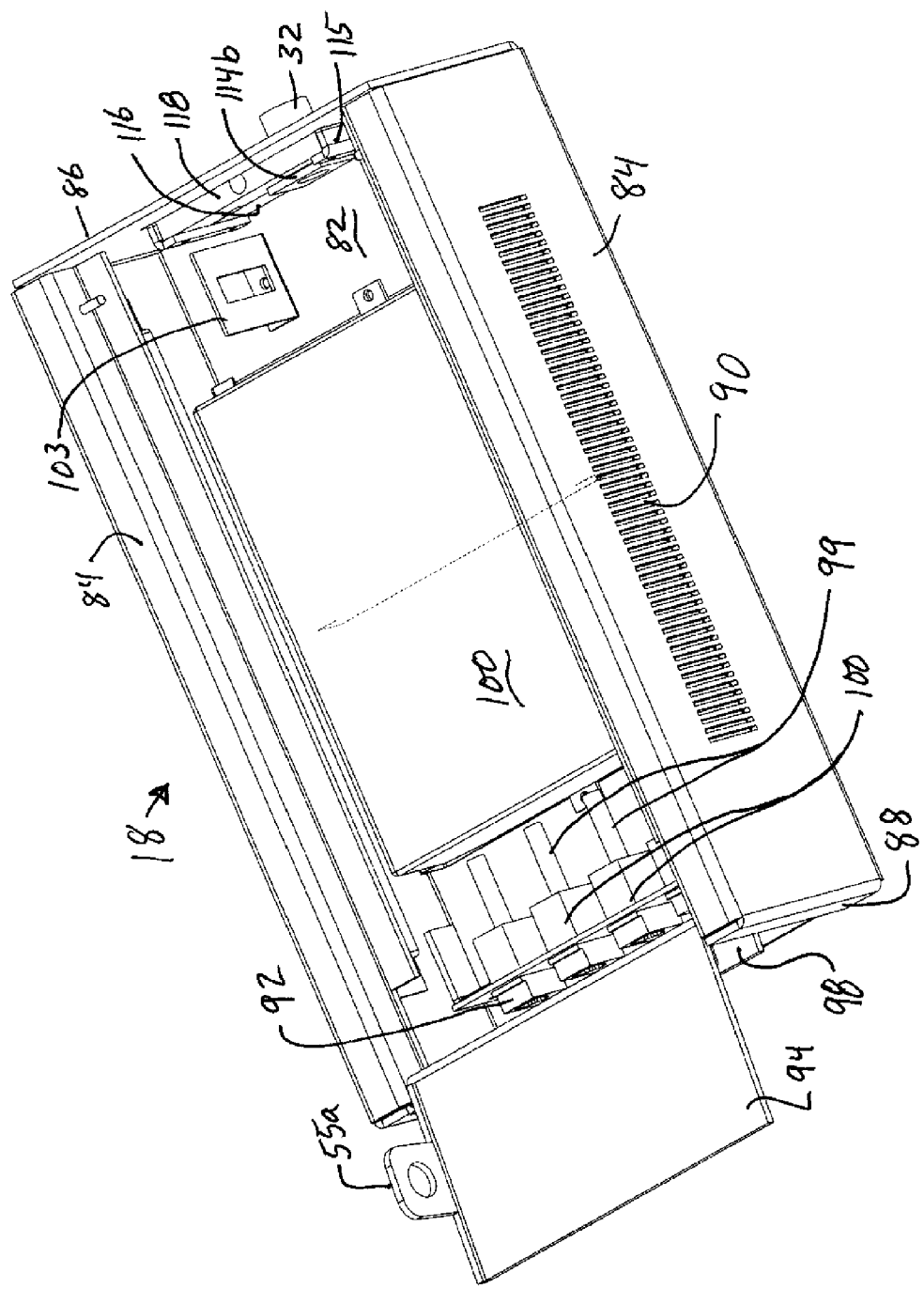
FIG. 6 shows a top perspective view of a secure cable lock box also shown in FIG. 4 but without the fiber optic cable connected.
Figure 7:
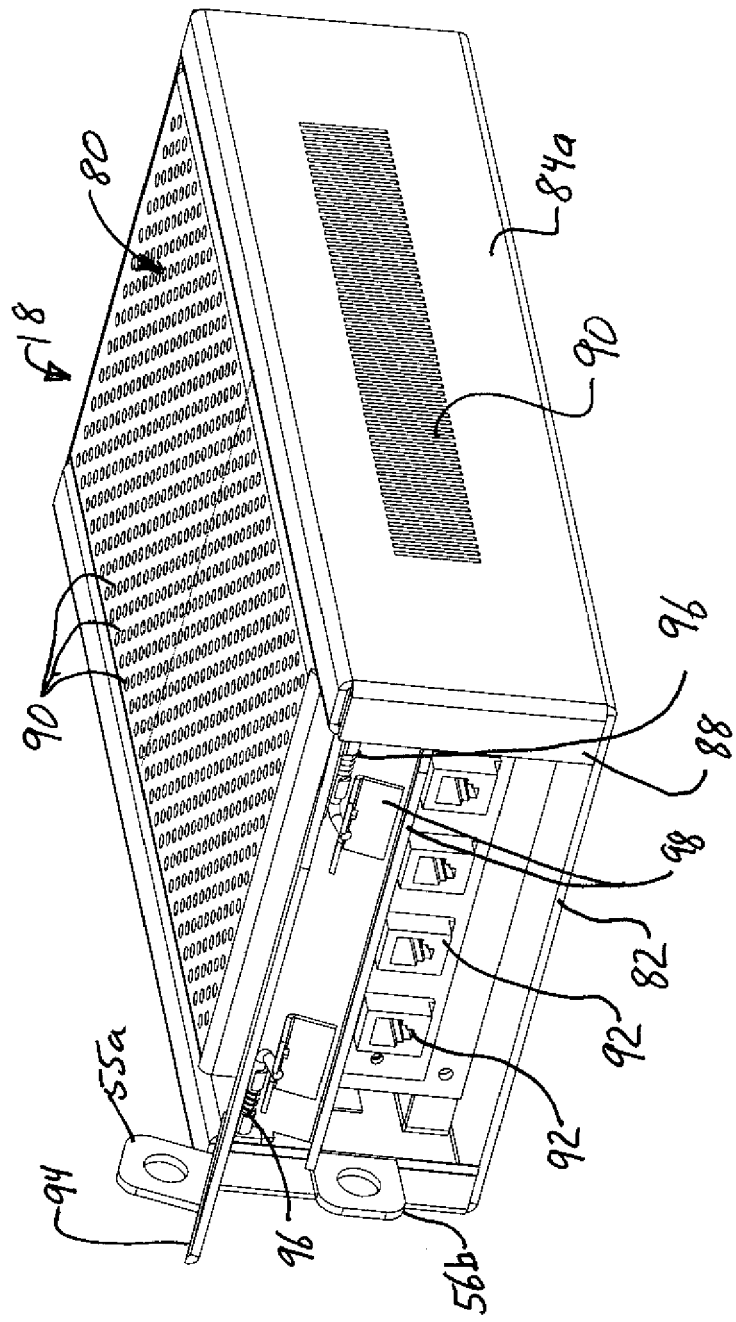
FIG. 7 is a perspective view of the user lock box of FIGS. 4 and 6.

Referring to FIGS. 4, 6 and 7, the user lock box 18 is described in more detail. Physically, the user lock box 18 can have various shapes and constructions. Advantageously, the user lock box 18 meets all U.S. Air force AFI33-201V8 mandatory requirements for protective distribution systems (PDS) or any other regulatory or security requirements imposed by other organizations or imposed in the future. As shown in the figures, the box 18 has a rectangular box having a top 80, an opposing bottom 82 joined by opposing sidewalls 84*a*, and 84*b*. Input end panel 86 covers one end and opposing output end panel 88 covers the other end of the user lock box 18. Vents 90 are advantageously formed in sidewalls 84 and top 80, with the vents being small enough to inhibit tampering and access for data theft, but large enough and numerous enough to allow air flow for cooling. The top, bottom, ends and sidewalls form an enclosed, sealed container which cannot be accessed without authorization, or by physically damaging part of the lock box and leaving visual evidence of that damage. The various walls, sides and bottom are typically welded with ground seams, made of bent metal joined internal the box 18, or made with nesting joints as in the lid 48 of junction box 14. On junction box 14, any non-removable sides, walls, top, bottom etc. are also preferably welded with ground seams. On both boxes 14, 18, there are preferably no screw access points on any of the visible sides, ends or surfaces, although flush screw mounts on bottom surface that mates to the floor are sometimes used.

Functionally, the input end 86 has at least one connector for receiving a cable 26 from junction box 14. Output end 88 has at least one output connector 92 for data communication with a user device such as a computer (not shown) or for connection to a fiber optical network. FIG. 7 shows a plurality of network patch cords (CAT5E, 6, 7) as comprising the output connectors 92. The user lock box has appropriate internal apparatus to provide fiber optic communication with the desired output connections 92. FIG. 4 shows a connection with only one of four outputs 92, but appropriate routers and cable dividers can be provided to place any of the outputs 92 in signal communication with the cable 26. FIG. 6 shows internal part 100, which is an appropriate device to provide at least fiber to desk (FTTD) or fiber to optical network terminal (ONT or PON) signal connection to the outputs 92 through network patch cords 99 and network couplers 101.

The routing of non-secured data transfer lines 29 are similar to the routing of alarmed line 28*a*, except no alarm lines 70*a* out or 70*a* return accompany the non-secured data transfer lines 29. The non-secured data transfer lines 29 may pass through a user lock box 18, or not, with the fiber optic cables 59 connecting directly to the desired desk or optical network as desired.

The output connectors 92 are physically shielded by pivoted cover 94 which rotate on hinges 96 extending from or between sidewalls 84 and connected to the upper edge of cover 94. The cover 94 is shown as being sized to cover the four outlets 92 and to cover the outlet end 88. The cover 94 has an end 98 forming a U-shape in cross-section, with the hinge 96 located in this U-shaped channel. The U-shaped channel limits external access to the hinges 96. The lock box 14 is configured to limit access to only authorized personnel, via use of various locking devices including keyed locks, padlocks, or electronic locks which may be unlocked by the authorized personnel. As with the junction box 14, a two-part hasp 55*a*, 55*b* each part respectively connected to a different one of the cover 94 and lock box 18 is used with a padlock (not shown) to represent the locking mechanism. Any padlock is preferably a GSA authorized padlock. The locking mechanism and removable or rotating cover 94 limits access to the end of the fiber optic line and data connection.

Referring to FIG. 4, input fiber optic 26 (FIG. 10) is connected to junction box 14 and may comprise any one of cables 58a, 58b, and 58c. For simplicity it will be described as cable 58a, carrying data transmission lines 28a and alarm lines 70a out and 70a return, and the description of analogous lock boxes 14 for alarmed cables 58b, 58c are not give. Data transmission line 28a is placed in signal communication with one or more of output connectors 92 as described above. Alarm line 70a out accompanies line 28a through a portion of the user lock box 18 and detects tampering with the accompanied line 28a. Preferably, one or both of alarm lines 70a out or 70a return accompany the data line 28a until the data line enters the electronic module 100 which provides fiber to desk (FTTD) or fiber to optical network terminal (ONT or PON) signal connection to the outputs 92. The alarm line 70a out passes through a loopback 102 that passes the alarm line 70a out back toward junction box 14 and back through cable 58a. After the loopback 102, the alarm line 70a out becomes alarm line 70a return as it returns to the junction box 14 through the cable 58a. Tampering with the data transfer line 28a affects alarm lines 70a out and/or 70a return, thus transmitting an alarm signal though cable 58a.

The loopback 102 may be located around an L-shaped bracket 103 (FIG. 6) having the short leg of the L fastened to the bottom 82 of the user lock box 18, with the long leg of the L extending from the bottom and having a width sufficient for the fiber optic line to bend around that leg of the bracket 103 without damaging the fiber optic line. Optionally, the fiber optic line may be fastened to the b racket 103.

Thus, the alarmed fiber 28/70 will loopback to the junction box 18 (FIG. 3), then loopback again to the next classified secret Internet protocol router network users within the network through a different user lock box 18, as illustrated in FIGS. 3 and 4. The classified secret Internet protocol router network fiber 28a will be connected the user device through a fiber to the desk (FTTD) or optical network terminal (ONT), depending on the network topology.

Referring to FIG. 8, the connector used in FIGS. 4-6 of cable 58a (and cables 26, 26, 59) to the lock box 18 and junction box 14 is shown. The locking sleeve connector 32 has a tubular or annular shank 110 sized to snugly fit over the outside of the shielded cable 26, 26, 58, 59 and is fastened to that cable by suitable adhesive, clamping, or other fastening mechanism. The tubular shank 110 extends from a mounting portion 112 having a through hole coaxial with the axis of the tubular shank 110 so the cable can pass through the entire connector 32. The mounting portion has two parallel flanges 114a, 114b spaced apart a distance that preferably corresponds to the thickness of the wall of junction box 14 or user box 18 or mounting bracket to which the connector 32 is to be fastened. The mounting portion 112 has a square or rectangular shape between the flanges 114. The flanges 114 are on at least the opposing upper and lower edges of the connector 32 using the orientation seen in FIG. 8.

Depending on the user classification type either red fiber optic connectors indicate classified secret Internet protocol router network users 3D and green fiber optic connectors are used to indicate un-classified Non-secure Internet protocol router network users 3C. Black fiber optic connectors are to be used for alarming feed for patching 3A. All of the patches will be terminated to the multi-plates mounted 5B within the junction box FIG. 5. These patches will also be user to activate or deactivate the data signal from the network for any user box FIG. 6. Thus, for un-classified non-secure Internet protocol router network users the fiber optic lines 29 may run directly to the user device, such as a fiber to the desk (FTTD) or optical network terminal (OTN), depending on the network topology. Classified secret Internet protocol router network users the will have lines 28 that are patched along with an alarmed fiber 70 to the secure user box 18, preferably using pre-terminated interlocking armored fiber jumper cables as generally illustrated in FIG. 2. Using a cable connector 32 allows the cable 26, 26, 58, 59 to connect securely to the secure junction boxes 14 and to the secure user box 18.

Referring to FIG. 11, in use, a mounting bracket 115 is attached to the appropriate wall of the junction box 14 or user box 18, surrounding at least a portion of the opening through which the cable 26, 26, 58, or 59 is to pass. The mounting bracket 115 has a U-shaped cross-section or forms a U-shaped cross-section with the wall of the box 14, 18. A lower restraint 126 is placed in the bracket slightly below the opening through which the cable 26, 26, 58, or 59 is to pass so that the bracket 115 stops the restraint 126 from moving away from the bracket, and either the bracket or the wall of the box 14, 18 stops the restraint from moving toward or past the wall. The cable and attached connector 32 are placed through the opening in the box 14, 18 so that the lower restraint is between the flanges 114 of the connector 32. An upper restraint 118 is then placed in the bracket 115 and into the space between flanges 114 of the connector 32, with the restraint 118 being limited in motion by the bracket 112 and wall of box 14, 18. The upper and lower restraints 126, 118 enclose the connector 32 and cooperate with the flanges 114 to limit movement of the connector relative to the restraints and the wall of the box 14, 18 to which the restraints are connected (through bracket 112. The flanges 114 prevent movement of connector 32 and the cable 26, 26, 58, 59 to which the connector is fastened. If needed, the lower and upper restraints can be held together by clips, screws, adhesives or other fasteners.

The flanges 114 on connector 32 can be on any opposing edges of the connector 32, top and bottom, or opposing sides, or on all four edges of the connector. The restraints 126, 118 are shaped and located to engage the flanges to restrain motion of the connector, and may extend horizontally, vertically, or at inclined angles so that the restraints for connector 32 are not limited to the specific embodiment illustrated. Since the connector 32 is fastened to the cable 26, 26, 58, 59 the cable cannot be removed from the box 14, 18 without damaging the cable, the connector 32, or the restraints 126, 118—thus leaving visual damage of tampering. The connectors 32 thus allow the cables to be connected to the boxes 14, 18 and secured from movement. The bracket 115 and restraints 116, 118 form a clamping mechanism or system to hold the connectors 32 and cables in position. But the specific structure can be varied, with the restraints taking differing forms as long as they engage the connectors to restrain movement relative to the box 14, 18 to which the connectors are ultimately fastened. Because the cable extends through a preformed opening in the connector 32, the connector does not put pressure on cable or cable jacket. Moreover, because the restraints 116, 118 and bracket 115 do not abut the cable, the cables are held with no physical compression on the cables by the connection with the boxes 14, 18. Still further, the restraints 116, 118 need not compress even the connector 32, further reducing the likelihood of squeezing the fiber optic cable 16, 26, 57, 58 fastened to and held by the connector 32. Additionally, the connectors 32 and their connection to the boxes 14, 18 eliminate visual and/or mechanical access to the inside of the box 14, 18 along the path where the cables interface with the connectors and clamping system.

Referring to FIG. 9, another configuration for connector 32 is shown in which the flanges are circular in shape rather than rectangular as in FIG. 8. Further, in the embodiment of FIG. 9, the mounting portion 112 between the flanges 114 has a generally cylindrical portion extending between the flanges 114, and a three sided, trapezoidal shape for the remainder of the shape. In both FIGS. 8 and 9, the non-circular shape of the mounting portion 112 cooperates with mating recesses in the upper and lower restraints 126, 118 to prevent rotation of the coupler 32 and thus inhibit removal of the connector 32 from the boxes 14, 18. The flanges 114 and shaped mounting portion 112 also help hold the connectors 32 and the associated cable 26, 26, 58, 59 in position during installation, making it easier to lock the connectors in place relative to the boxes 14, 18 in which the connectors 32 and associated cables are installed. Other shapes for the mounting portion could be used, but the mounting portion 112 between flanges 112 preferably has at least one flat side.

A cable 16, 26, 58, 59 with a connector 32 is believed to be new and to provide useful advantages as described herein. The fiber optical cables 16, 26, 58, 59 are preferably constructed using single mode fiber cores. The cables advantageously have a jacketing material made of aluminum interlocked armored material. Advantageously, the cables have one of the connectors 32 on adjacent each opposing end of the cable, with the offset from the adjacent cable end depending on how much cable is needed for routing within junction box 14, or user lock box 18, or distribution panel 12. Typically, the connectors 32 are located from a few inches to a few feet from the end, and in some instances each connector 32 is are within about 12 inches from the adjacent end of the cable. Advantageously, the connectors are affixed to the cable with epoxy or other suitable adhesive. Preferably, heat shrink tubing is placed over the epoxied connection and over the annular shank 110 and part of the cable to which the connector 32 is fastened, and then the tubing is shrunk.

The various cable connectors used in this fiber optic system and in panel 12 or boxes 14, 18 are advantageously SC single mode Angled Physical Contact (APC) polished connectors. The pre-terminated jumpers are preferably 100% lab tested with DB loss test results provided for verification. Further, the jumpers are preferably 4 core pre-terminated and interlocked armored jumpers.

Referring again to FIG. 10, the fiber optic lines 26, 57, 58 have opposing first and second ends extending from, between or through various ones of the boxes 14, 18 and distribution panels 12. The junction boxes 14 are typically the first boxes when the distribution system is viewed along the line of the data flowing through the fiber optic cables and lines within those cables. The user lock boxes 18 are usually the second boxes when the distribution system is viewed along the line of the data flowing through the fiber optic cables and lines within those cables. When the distribution system is viewed in the reverse direction, from the user lock box 18, then the user box is the first box and the junction box 14 is the second box, with the telecommunications room potentially containing further distribution boxes.

The interlocking armored fiber optic cables with the alarming lines and loopback features for each secured user allow the transmission of non-encrypted data to user terminals at 40 Gbps rates while meeting current government security requirements. As the capacity of fiber optic cables to carry data increases, the data transfer rate will also increase. This provides a significant improvement over the ability to carry data over copper or other metal lines, while providing the security needed for classified and other secured data transmission. Further, the ability to secure the fiber optic transmission lines without encryption significantly simplifies the system and increases the data transfer rate and the actual speed with which data may be accessed and used by the computers 19 associated with each user lock box.

The above description is given by way of example, and not limitation. Given the above disclosure, one skilled in the art could devise variations that are within the scope and spirit of the invention disclosed herein, including various ways of routing the alarm lines 70 along with the data transfer line 28 that is to be protected against intrusion. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A protective distribution system with alarmed, interlocking armored fiber optic cables, comprising:
   a distribution panel in a secured location, at least a first interlocking armored fiber optic cable connected to the distribution panel and carrying a fiber optic outgoing alarm line and a fiber optic return alarm line to transmit alarm signals, and at least one data line that is not connected to encryption devices or software and transmitting data that is not encrypted;
   a secured junction box connected to the first fiber optic cable and having a plurality of interlocking armored, outgoing fiber optic cables each connected at one end thereof to a locking component disposed entirely within the junction box and connected to a different secured user lock box at the other end of the each cable so as to transmit data through the outgoing fiber optic cables, wherein the locking component is configured to secure, without compressing, the plurality of fiber optic cables and to aid in detecting data transmission interruption;
   at least a selected group of the plurality of outgoing fiber optic cables each having a fiber optic data transfer line transmitting the non-encrypted data, and in addition having the fiber optic outgoing alarm line and the fiber optic return alarm line to transmit alarm signals, the selected group containing at least a first cable with a first outgoing alarm line and a first return alarm line and a last cable having a last outgoing alarm line and a last return alarm line;
   a jumper in each user lock box that is connected to the selected group of fiber optic cables, the jumper looping the outgoing alarm line to the return alarm line contained within the same cable connected to that user lock box so an alarm signal can pass from the outgoing line to the return line;
   at least one jumper in the secured junction box connecting the return alarm line of the first cable within the selected group to the outgoing alarm line of another cable within the selected group to form a continuous fiber optic path of connected alarm lines through the secured user boxes associated with the first cable and said another cable until the last return alarm line is in fiber optic communication with the first outgoing alarm line; and
   a detector in communication with at least the return alarm line which is in fiber optic communication with the return alarm line at the distribution panel, the detector configured to detect an alarm signal in the continuous fiber optic path of connected alarm lines.

2. The system of claim 1, wherein the secured user lock box contains at least one of an outgoing alarm line and a return alarm line that encircles a substantial portion of the user lock box.

3. The system of claim 1, wherein the secured user lock box is connected to a passive optical network.

4. The system of claim 1, wherein the alarm detector and control panel are in a telecommunications room.

5. The system of claim 1, wherein the secure junction box and secure user lock box meet all US Air Force AFI33-201V8 mandatory requirements for protective distribution systems.

6. The system of claim 1, wherein the distribution panel, junction box and all of the secured user lock boxes are on the same floor of a building.

7. A protective distribution system comprising:
a fiber optic cable that include a fiber optic outgoing alarm line and a fiber optic return alarm line to transmit alarm signals;
a connector coupled to one end of the fiber optic cable,
a detector arranged to transmit signals into the outgoing alarm line and being in communication with the return alarm line and configured to detect changes in the signals indicative of an intrusion or movement of the fiber optic cable; and
a box connected to the fiber optic cable;
wherein the fiber optic cable includes at least one data line for transmitting data and if the data transmission is interrupted, the interruption is detected by the detector; and
wherein the connector aids in detection of data transmission interruption by interlockingly engaging a locking component that is disposed entirely within an interior of the box along an inner surface thereof to securely lock the fiber optic cable in place without compressing the fiber optic cable.

8. The protective distribution system of claim 7, wherein the detector is configured to identify a location of the intrusion or movement of the fiber optic cable.

9. The protective distribution system of claim 7, wherein a plurality of fiber optic cables are connected to the detector and to the box, each fiber optic cable including an outgoing alarm line and a return alarm line.

10. The protective distribution system of claim 9, wherein the box comprises a junction box that has an openable secured door.

11. The protective distribution system of claim 10, wherein the door has a depending flange around edges thereof and sides of the box have channels formed therein along upper edges of the sides of the box, the channels configured to receive the flange whereby the mating between the flange and the channels block straight line access to an interior of the junction box.

12. The protective distribution system of claim 10, wherein the fiber optic cables are routed through the junction box along fiber optic guides to corresponding outlet connectors and corresponding outgoing fiber optic cables that are connected to downstream equipment.

13. The protective distribution system of claim 12, wherein the downstream equipment comprises one or more user lock boxes.

14. The protective distribution system of claim 9, wherein a single line defines the outgoing alarm line and the return alarm line and is used to alarm a plurality of data lines.

15. The protective distribution system of claim 13, wherein each user lock box has at least one connector for receiving one fiber optic cable from the junction box and at least one output connector for data communication with a user device or for connection to a fiber optical network.

16. The protective distribution system of claim 1, wherein the plurality of interlocking armored, outgoing fiber optic cables are connected to at least one of the secured junction box and the secured user box via a plurality of connectors, each connector having an annular shank through which each one of the interlocking armored, outgoing fiber optic cables passes and at which location the cable is adhered to the connector, and
each connector having two parallel, spaced flanges extending outward from the connector on at least two opposing sides of the connector and the flanges are rigidly and permanently connected thereto, wherein the flanges include two surfaces perpendicular to a longitudinal axis of the cable passing through, such surfaces being sized, shaped, and spaced to provide locking engagement with the locking component at a location within the interior of at least one of the junction box and the user lock box along an inner surface thereof wherein the flanges prevent inward and outward movement of the connector with respect to least one of the junction box and the user lock box in a first condition in which the connector is connected to the at least one of the junction box and the user lock box.

17. The protective distribution system of claim 1, wherein the plurality of interlocking, armored, outgoing fiber optic cables are at least one of being pre-terminated and being pre-connectorized.

18. The protective distribution system of claim 1, wherein a user can enable encryption at least a portion of the at least one data line that is transmitting data that is not encrypted.

19. The protective distribution system of claim 7, wherein the locking component comprises a mounting bracket, an upper restraint and a lower restraint disposed within the mounting bracket, and wherein the connector is disposed between the upper restraint and the lower restraint.

20. The protective distribution system of claim 19, wherein the connector comprises an annular shank through which the fiber optic cable passes and at which location the cable is adhered to the connector, and
two parallel, spaced flanges extending outward from the connector on at least two opposing sides of the connector and the flanges are rigidly and permanently connected thereto, wherein the flanges include two surfaces perpendicular to a longitudinal axis of the cable passing through, such surfaces being sized, shaped, and spaced to provide locking engagement with the upper and lower restraints wherein the flanges prevent inward and outward movement of the connector with respect to the box in a first condition in which the connector is connected to the box.

21. The protective distribution system of claim 7, wherein the box includes an opening through which the fiber optic cable passes and the locking component comprises a mounting bracket that includes two legs spaced apart from one another, the mounting bracket receiving a lower restraint that is disposed below the opening when the lower restraint is securely attached to the mounting bracket, the connector being configured to lockingly engage an upper edge of the lower restraint, the mounting bracket further receiving an upper restraint having a lower edge which lockingly engages the connector and thereby encloses the connector and limits movement of the connector and the fiber optic cable attached thereto.

22. The protective distribution system of claim 21, wherein the connector includes first and second walls that define a space therebetween, the space being configured to receive the upper edge of the lower restrain and the lower edge of the upper restraint in opposite locations so as to lock the connector in place.

\* \* \* \* \*